United States Patent
Kennedy, III et al.

(10) Patent No.: US 7,361,101 B2
(45) Date of Patent: Apr. 22, 2008

(54) GOLF BALL AND THERMOPLASTIC MATERIAL

(75) Inventors: Thomas J. Kennedy, III, Wilbraham, MA (US); Mark L. Binette, Ludlow, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 11/613,469

(22) Filed: Dec. 20, 2006

(65) Prior Publication Data
US 2007/0087864 A1    Apr. 19, 2007

Related U.S. Application Data

(63) Continuation of application No. 10/905,925, filed on Jan. 26, 2005, now Pat. No. 7,156,755.

(51) Int. Cl.
    *A63B 37/06*    (2006.01)
(52) U.S. Cl. ..................................... 473/374
(58) Field of Classification Search ............... 473/373, 473/374, 378, 376, 367, 368
    See application file for complete search history.

(56) References Cited

U.S. PATENT DOCUMENTS

| | | |
|---|---|---|
| 2,549,935 A | 4/1951 | Sauer |
| 2,598,283 A | 5/1952 | Miller |
| 2,946,763 A | 7/1960 | Bro et al. |
| 3,013,967 A | 12/1961 | Ruon-Miller et al. |
| 3,051,683 A | 8/1962 | Mallouk |
| 3,125,547 A | 3/1964 | Blatz |
| 3,132,124 A | 5/1964 | Couture et al. |
| 3,196,194 A | 7/1965 | Ely Jr., et al. |
| 3,231,635 A | 1/1966 | Holden et al. |
| 3,264,272 A | 8/1966 | Rees |
| 3,265,092 A | 8/1966 | Ely Jr., et al. |
| 3,265,622 A | 8/1966 | Anderson |
| 3,278,495 A | 10/1966 | Hagel et al. |
| 3,365,520 A | 1/1968 | Foster |
| 3,384,612 A | 5/1968 | Brandt et al. |
| 3,404,134 A | 10/1968 | Rees |
| 3,454,280 A | 7/1969 | Harrison et al. |
| 3,461,129 A | 8/1969 | Middleton |
| 3,481,908 A | 12/1969 | Mortimer |
| 3,503,945 A | 3/1970 | Kim |
| 3,505,301 A | 4/1970 | Natta et al. |
| 3,573,125 A | 3/1971 | Elliott |
| 3,645,992 A | 2/1972 | Elston |
| 3,649,578 A | 3/1972 | Bush |
| 3,671,477 A | 6/1972 | Nesbitt |
| 3,769,252 A | 10/1973 | Fujii et al. |
| 3,789,035 A | 1/1974 | Iwami et al. |
| 3,819,768 A | 6/1974 | Molitor |

(Continued)

*Primary Examiner*—Raeann Trimiew
(74) *Attorney, Agent, or Firm*—Michael A. Catania; Elaine H. Lo

(57) ABSTRACT

Disclosed herein is a novel thermoplastic material and a golf ball utilizing the thermoplastic material. The golf ball (10) preferably comprises a core (12), a cover (16) and optionally a boundary layer (14). At least one of the core (12), cover (16) or boundary layer (14) of the golf ball (10) comprises the thermoplastic material. The thermoplastic material comprises a partially to highly neutralized blend of copolymers additionally comprising a fatty acid or fatty acid salt. The golf ball component of the invention has soft feel and resilience that is maintained or improved.

6 Claims, 1 Drawing Sheet

U.S. PATENT DOCUMENTS

| | | |
|---|---|---|
| 3,823,108 A | 7/1974 | Bissot |
| 3,847,854 A | 11/1974 | Canter |
| 3,870,841 A | 3/1975 | Makowski et al. |
| 3,904,575 A | 9/1975 | Satokawa et al. |
| 3,927,137 A | 12/1975 | Bryson |
| 4,001,195 A | 1/1977 | Wyatt |
| 4,075,362 A | 2/1978 | Concannon |
| 4,122,248 A | 10/1978 | Pfleger et al. |
| 4,123,602 A | 10/1978 | Ukihashi et al. |
| 4,150,208 A | 4/1979 | Hwang |
| 4,172,859 A | 10/1979 | Epstein |
| 4,173,345 A | 11/1979 | Pocklington |
| 4,174,358 A | 11/1979 | Epstein |
| 4,238,376 A | 12/1980 | Wilson |
| 4,264,075 A | 4/1981 | Miller |
| 4,299,744 A | 11/1981 | Stewart |
| 4,302,554 A | 11/1981 | Nabeta et al. |
| 4,310,638 A | 1/1982 | Coran |
| 4,338,413 A | 7/1982 | Coran et al. |
| 4,346,194 A | 8/1982 | Roura |
| 4,351,931 A | 9/1982 | Armitage |
| 4,359,561 A | 11/1982 | Fraser et al. |
| 4,360,488 A | 11/1982 | Barham et al. |
| 4,380,618 A | 4/1983 | Khan et al. |
| 4,381,384 A | 4/1983 | Khan |
| 4,404,325 A | 9/1983 | Mason et al. |
| 4,424,330 A | 1/1984 | Raviola |
| 4,431,193 A | 2/1984 | Nesbitt |
| 4,479,989 A | 10/1984 | Mahal |
| 4,506,061 A | 3/1985 | Makino et al. |
| 4,509,821 A | 4/1985 | Stenger |
| 4,517,340 A | 5/1985 | Read et al. |
| 4,526,375 A | 7/1985 | Nakade |
| 4,528,329 A | 7/1985 | Inoue et al. |
| 4,550,130 A | 10/1985 | Kishida et al. |
| 4,552,925 A | 11/1985 | Nakagawa et al. |
| 4,555,546 A | 11/1985 | Patel |
| 4,567,219 A | 1/1986 | Tominaga |
| 4,579,918 A | 4/1986 | Metzger et al. |
| 4,591,611 A | 5/1986 | Jenkins et al. |
| 4,595,730 A | 6/1986 | Blondel |
| 4,602,058 A | 7/1986 | Graham et al. |
| 4,626,587 A | 12/1986 | Morgan et al. |
| 4,668,752 A | 5/1987 | Tominari et al. |
| 4,675,380 A | 6/1987 | Buckmaster et al. |
| 4,679,795 A | 7/1987 | Melvin et al. |
| 4,690,981 A | 9/1987 | Statz |
| 4,694,042 A | 9/1987 | McKee |
| 4,720,516 A | 1/1988 | Kishida et al. |
| 4,742,122 A | 5/1988 | Buckmaster et al. |
| 4,748,206 A | 5/1988 | Ngiwa et al. |
| 4,749,752 A | 6/1988 | Youlu et al. |
| 4,761,328 A | 8/1988 | Shin |
| 4,774,290 A | 9/1988 | Neill et al. |
| 4,788,265 A | 11/1988 | Pfleger et al. |
| 4,789,717 A | 12/1988 | Giannetti et al. |
| 4,801,649 A | 1/1989 | Statz |
| 4,835,218 A | 5/1989 | Yoshimura et al. |
| 4,848,770 A | 7/1989 | Shama |
| 4,857,611 A | 8/1989 | Durand et al. |
| 4,864,006 A | 9/1989 | Giannetti et al. |
| 4,884,814 A | 12/1989 | Sullivan |
| 4,902,456 A | 2/1990 | Yen et al. |
| 4,904,735 A | 2/1990 | Chapman, Jr. et al. |
| 4,911,451 A | 3/1990 | Sullivan |
| 4,919,434 A | 4/1990 | Saito |
| 4,955,966 A | 9/1990 | Yuki et al. |
| 4,956,414 A | 9/1990 | Muehlenbernd et al. |
| 4,984,804 A | 1/1991 | Yamada et al. |
| 4,990,574 A | 2/1991 | Yamada |
| 5,000,459 A | 3/1991 | Isaac |
| 5,068,151 A | 11/1991 | Nakamura |
| 5,087,680 A | 2/1992 | Duan et al. |
| 5,091,471 A | 2/1992 | Graves et al. |
| 5,093,422 A | 3/1992 | Himes |
| 5,096,201 A | 3/1992 | Egashira et al. |
| 5,106,911 A | 4/1992 | Chapman, Jr. et al. |
| 5,120,791 A | 6/1992 | Sullivan |
| 5,134,209 A | 7/1992 | Job et al. |
| 5,155,157 A | 10/1992 | Statz et al. |
| 5,197,740 A | 3/1993 | Pocklington |
| 5,198,511 A | 3/1993 | Brown-Wensley et al. |
| 5,204,429 A | 4/1993 | Kaminsky et al. |
| 5,208,309 A | 5/1993 | McDaniel et al. |
| 5,209,485 A | 5/1993 | Nesbitt |
| 5,216,074 A | 6/1993 | Imai et al. |
| 5,218,057 A | 6/1993 | Kurkov et al. |
| 5,218,071 A | 6/1993 | Tsutsui et al. |
| 5,244,969 A | 9/1993 | Yamada |
| 5,250,612 A | 10/1993 | Hazlitt et al. |
| 5,260,126 A | 11/1993 | Collier, IV et al. |
| 5,266,639 A | 11/1993 | Chapman, Jr. et al. |
| 5,272,236 A | 12/1993 | Lai et al. |
| 5,274,041 A | 12/1993 | Yamada |
| 5,278,272 A | 1/1994 | Lai et al. |
| 5,281,651 A | 1/1994 | Arjunan et al. |
| 5,298,571 A | 3/1994 | Statz et al. |
| 5,306,760 A | 4/1994 | Sullivan |
| 5,312,857 A | 5/1994 | Sullivan |
| 5,318,849 A | 6/1994 | Mchalla et al. |
| 5,321,089 A | 6/1994 | Cadorniga et al. |
| 5,340,840 A | 8/1994 | Park et al. |
| 5,397,829 A | 3/1995 | Morgan et al. |
| 5,397,840 A | 3/1995 | Sullivan et al. |
| 5,415,937 A | 5/1995 | Cadorniga et al. |
| 5,464,904 A | 11/1995 | Chapman, Jr. et al. |
| 5,475,075 A | 12/1995 | Brant et al. |
| 5,492,971 A | 2/1996 | Williams |
| 5,492,972 A | 2/1996 | Stefani |
| 5,508,350 A | 4/1996 | Cadorniga et al. |
| 5,508,351 A | 4/1996 | Horiuchi et al. |
| 5,516,847 A | 5/1996 | Sullivan et al. |
| 5,542,677 A * | 8/1996 | Sullivan et al. ............. 473/385 |
| 5,565,521 A | 10/1996 | Effler et al. |
| 5,688,191 A | 11/1997 | Cavallaro et al. |
| 5,688,869 A | 11/1997 | Sullivan |
| 5,691,418 A | 11/1997 | Hagman et al. |
| 5,789,475 A | 8/1998 | Chen |
| 5,803,831 A | 9/1998 | Sullivan et al. |
| 5,816,944 A | 10/1998 | Asakura et al. |
| 5,836,834 A | 11/1998 | Masutani et al. |
| 5,866,663 A | 2/1999 | Brookhart et al. |
| 5,880,241 A | 3/1999 | Brookhart et al. |
| 5,880,323 A | 3/1999 | Brookhart et al. |
| 5,891,963 A | 4/1999 | Brookhart et al. |
| 5,895,105 A | 4/1999 | Nesbitt |
| 5,902,855 A | 5/1999 | Sullivan |
| 5,916,989 A | 6/1999 | Brookhart et al. |
| 5,942,461 A | 8/1999 | Brown et al. |
| 5,973,046 A | 10/1999 | Chen et al. |
| 6,034,259 A | 3/2000 | Brookhart et al. |
| 6,071,201 A | 6/2000 | Maruko |
| 6,083,119 A | 7/2000 | Sullivan et al. |
| 6,100,321 A | 8/2000 | Chen |
| 6,100,340 A | 8/2000 | Rajagopalan et al. |
| 6,107,422 A | 8/2000 | Wang et al. |
| 6,140,439 A | 10/2000 | Brookhart et al. |
| 6,254,495 B1 | 7/2001 | Nakamura et al. |
| 6,287,217 B1 * | 9/2001 | Sullivan et al. ............. 473/374 |
| 6,290,612 B1 | 9/2001 | Maruko et al. |
| 6,306,049 B1 | 10/2001 | Rajagopalan |
| 6,329,458 B1 | 12/2001 | Takesue et al. |
| 6,431,998 B1 | 8/2002 | Nakamura et al. |
| 6,485,378 B1 | 11/2002 | Boehm |

| | | | | | |
|---|---|---|---|---|---|
| 6,562,906 B2 | 5/2003 | Chen | 2002/0013421 A1 | 1/2002 | Takesue et al. |
| 6,565,455 B2 | 5/2003 | Hayashi et al. | 2002/0037968 A1 | 3/2002 | Chen |
| 6,595,874 B2 | 7/2003 | Sullivan et al. | 2002/0055400 A1 | 5/2002 | Higuchi et al. |
| 6,613,842 B2 | 9/2003 | Rajagopalan | 2002/0061793 A1 | 5/2002 | Higuchi et al. |
| 6,653,382 B1 | 11/2003 | Statz et al. | 2002/0091188 A1 | 7/2002 | Statz et al. |
| 7,156,755 B2 | 1/2007 | Kennedy, III et al. | 2002/0099120 A1 | 7/2002 | Takesue et al. |
| 2001/0008925 A1 | 7/2001 | Brown et al. | 2002/0111407 A1 | 8/2002 | Takesue et al. |
| 2001/0018375 A1 | 8/2001 | Hayashi et al. | 2002/0177492 A1 | 11/2002 | Watanabe et al. |
| 2001/0019971 A1 | 9/2001 | Hayashi et al. | | | |
| 2001/0024982 A1* | 9/2001 | Cavallaro et al. ........... 473/377 | * cited by examiner | | |

GOLF BALL AND THERMOPLASTIC MATERIAL

CROSS REFERENCES TO RELATED APPLICATIONS

The Present Application is a Continuation Application of U.S. patent application Ser. No. 10/905,925, filed on Jan. 26, 2005 now U.S. Pat. No. 7,156,755.

STATEMENT REGARDING FEDERALLY SPONSORED RESEARCH OR DEVELOPMENT

Not Applicable

BACKGROUND OF THE INVENTION

1. Field of the Invention

The present invention relates to a thermoplastic material and its use in a golf ball.

2. Description of the Related Art

Traditional golf ball covers have been comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green. Moreover, the soft balata covers produce a soft "feel" to the low handicap player. Such playability properties (workability, feel, etc.) are particularly important in short iron play with low swing speeds and are exploited significantly by relatively skilled players.

Despite all the benefits of balata, balata covered golf balls are easily cut and/or damaged if mis-hit. Golf balls produced with balata or balata-containing cover compositions therefore have a relatively short lifespan.

As a result of this negative property, balata and its synthetic substitutes, trans-polybutadiene and transpolyisoprene, have been essentially replaced as the cover materials of choice by new cover materials comprising ionomeric resins.

Ionomeric resins are polymers containing interchain ionic bonding. As a result of their toughness, durability and flight characteristics, various ionomeric resins sold by E.I. DuPont de Nemours & Company under the trademark "Surlyn7" and more recently, by the Exxon Corporation (see U.S. Pat. No. 4,911,451) under the trademark "Iotek", have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, such as durability, for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are many commercial grades of ionomers available both from DuPont and Exxon, with a wide range of properties which vary according to the type and amount of metal cations, molecular weight, composition of the base resin (such as relative content of ethylene and methacrylic and/or acrylic acid groups) and additive ingredients such as reinforcement agents, and the like, a great deal of research continues in order to develop a golf ball cover composition exhibiting not only the improved impact resistance and carrying distance properties produced by the "hard" ionomeric resins, but also the playability (for example, "spin", "feel", and the like) characteristics previously associated with the "soft" balata covers, properties which are still desired by the more skilled golfer.

Consequently, a number of golf balls have been produced to address these needs. The different types of materials utilized to formulate the cores, mantles, and covers of these balls dramatically alters the balls' overall characteristics. In addition, multi-layered covers containing one or more ionomer resins have also been formulated in an attempt to produce a golf ball having the overall distance, playability and durability characteristics desired.

This was addressed in U.S. Pat. No. 4,431,193 where a multi-layered golf ball is produced by initially molding a first cover layer on a spherical core and then adding a second layer. The first layer is comprised of a hard, high flexural modulus resinous material such as Surlyn7 8940, a sodium ion based low acid (less than or equal to 16 weight percent methacrylic acid) ionomer resin having a flexural modulus of about 51,000 psi. An outer layer of a comparatively soft, low flexural modulus resinous material such Surlyn7 9020 is molded over the inner cover layer. Surlyn7 9020 is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball that attains or approaches the maximum initial velocity limit of 255 feet per second as provided by the United States Golf Association (U.S.G.A.) rules. The relatively soft, low flexural modulus outer layer provides for the advantageous "feel" and playing characteristics of a balata covered golf ball.

In various attempts to produce a durable, high spin ionomer golf ball, the golfing industry has blended the hard ionomer resins with a number of softer ionomeric resins. For Example, U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid, and an acrylate ester. It has been found that golf ball covers formed from hard-soft ionomer blends tend to become scuffed more readily than covers made of hard ionomer alone. It would be useful to develop a golf ball having a combination of softness and durability which is better than the softness-durability combination of a golf ball cover made from a hard-soft ionomer blend.

Most professional golfers and good amateur golfers desire a golf ball that provides distance when hit off a driver, control and stopping ability on full iron shots, and high spin on short "touch and feel" shots. Many conventional golf balls have undesirable high spin rates on full shots. The excessive spin on full shots is a sacrifice made in order to achieve more spin on the shorter touch shots. It would be beneficial to provide a golf ball which has high spin for touch shots without generating excessive spin on full shots while maintaining or improving some of the other properties of the golf ball.

BRIEF SUMMARY OF THE INVENTION

The present invention is a novel thermoplastic material and its use in a golf ball as a core, cover or intermediate layer. The novel thermoplastic material is composed of a blend of highly neutralized polymers containing fatty acids or fatty acid salts. The novel material has a greater coefficient of restitution than other thermoplastic materials.

One aspect of the present invention is a golf ball, comprising a core, and a cover layer disposed on the core, wherein at least one of the cover and the core is formed from a partially to highly neutralized thermoplastic material containing fatty acids or fatty acid salts. The thermoplastic material preferably comprises a blend of an alpha olefin and an acid, such as ethylene acrylic acid, and an alpha olefin and an alkyl acrylate, such as ethylene butyl acrylate. Alternatively, the thermoplastic material may comprise a blend of an alpha olefin, an acid and a softening comonomer such as an alkyl acrylate (also referred to as a terpolymer), and an alpha olefin and an alkyl acrylate. The blend is modified using fatty acids or fatty acids salts, such as metal stearates or stearic acids. Other polymers, such as metallocenes, urethanes, and other materials known in the art may also be added and/or substituted for blend modification as desired.

In a particularly preferred form of the invention the thermoplastic material comprises a blend of two or more copolymers, wherein the first copolymer is formed from an olefin having 2 to 8 carbon atoms, and an acid which includes at least one member selected from the group consisting of alpha, beta-ethylenically unsaturated mono- or dicarboxylic acids with a portion of the acid being neutralized with cations, and the second copolymer is formed from an olefin having 2 to 8 carbon atoms, and an alkyl acrylate having from 1 to 8 carbon atoms in the alkyl group. A softening comonomer may also be added to either or both of the copolymers, such as an unsaturated monomer of the acrylate ester class having from 1 to 21 carbon atoms.

Another preferred form of the invention is a thermoplastic material comprising a blend of two or more copolymers, wherein the first copolymer is formed from an olefin having 2 to 8 carbon atoms, and an acid which includes at least one member selected from the group consisting of alpha, beta-ethylenically unsaturated mono- or dicarboxylic acids with a portion of the acid being neutralized with cations, and a softening comonomer such as an alkyl acrylate having from 1 to 8 carbon atoms in the alkyl group, and the second copolymer is formed from an olefin having 2 to 8 carbon atoms, and an alkyl acrylate having from 1 to 8 carbon atoms in the alkyl group. A softening comonomer may also be added to the second copolymer.

Another aspect of the present invention is a golf ball having a core, boundary layer and cover. The core includes a polybutadiene mixture, has a diameter ranging from 1.35 inches to 1.64 inches and has a PGA compression ranging from 50 to 90. The boundary layer is formed over the core and is composed of a thermoplastic material. The boundary layer has a thickness ranging from 0.020 inch to 0.075 inch, and a Shore D hardness ranging from 50 to 70 as measured according to ASTM-D2240. The thermoplastic material comprises a copolymer of an alpha-olefin and an alpha, beta-unsaturated carboxylic acid, an alpha-olefin and an alkyl acrylate, and a fatty acid or salt of a fatty acid, with the thermoplastic material neutralized from 50% to 100%. The cover is formed over the boundary layer. The cover is composed of a fast chemical reaction aliphatic polyurethane material formed from reactants comprising and a polyurethane prepolymer and a polyol. The polyurethane material has a Shore D hardness ranging from 30 to 60 as measured according to ASTM-D2240, a thickness ranging from 0.015 inch to 0.044 inch, and an aerodynamic surface geometry thereon.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
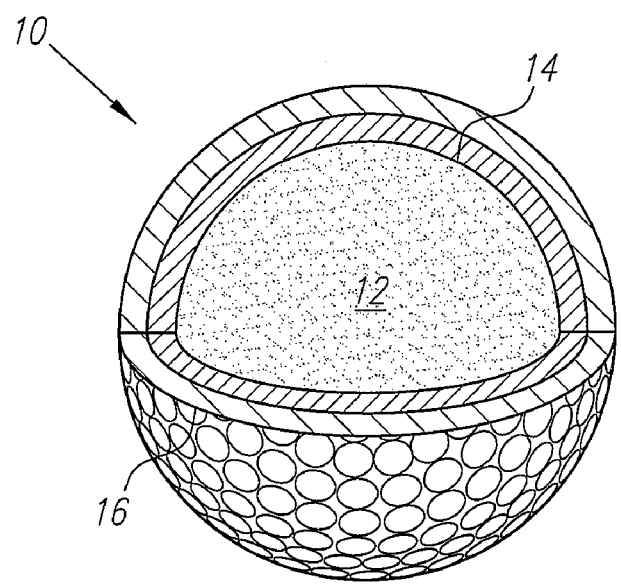
FIG. 1 illustrates a perspective view of a golf ball of the present invention including a cut-away portion showing a core, a boundary layer, and a cover.
Figure 2:
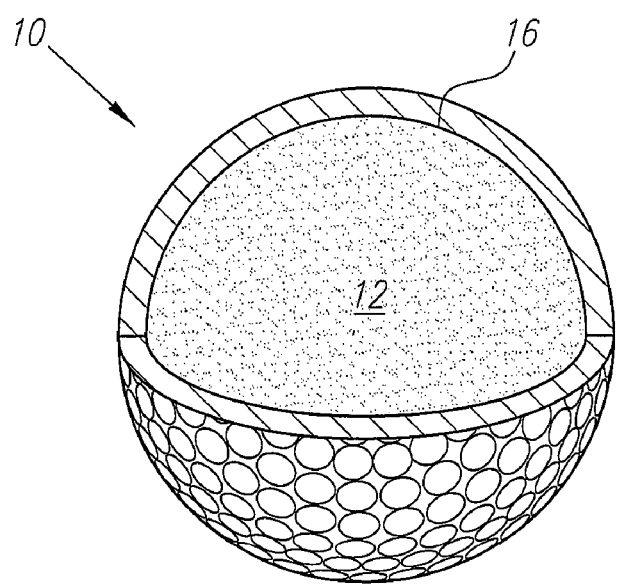
FIG. 2 illustrates a perspective view of a golf ball of the present invention including a cut-away portion core and a cover.

The present invention relates to a novel thermoplastic material and its use in golf equipment, particularly a golf ball 10. As shown in FIG. 1, a three-piece solid golf ball comprises a core 12, a boundary 14 and a cover 16. As shown in FIG. 2, a two-piece golf ball comprises a core 12 and a cover 16. At least one of the components of the golf ball comprises a novel thermoplastic material as further described below.

More particularly, new highly neutralized blends have been produced by the inventors by neutralizing, to various extents, a blend of 1) a copolymer of an alpha-olefin and an alpha, beta-unsaturated carboxylic acid (hereinafter an "acid copolymer" and referred to as "EX"), 2) an alpha-olefin and an alkyl acrylate (hereinafter an "alkyl acrylate copolymer" and referred to as "EY"), and 3) a fatty acid or salt of a fatty acid. A softening comonomer may be added to either or both of the copolymers. Other polymers, including but not limited to, metallocenes, urethanes, and the like, may also be added to either or both of the copolymers or to the blend for further modification. In contrast, a blend of "EXY" is a blend of an alpha-olefin, an alpha, beta-unsaturated carboxylic acid and an alkyl acrylate, such as ethylene/acrylic acid/ethyl acrylate.

The acid copolymer used herein may contain anywhere from 1 to 30 percent by weight acid. A high acid copolymer containing greater than 16% by weight acid, preferably from about 17 to about 25 weight percent acid, and more preferably about 20 weight percent acid, or a low acid copolymer containing 16% by weight or less acid may be used as desired. The acid copolymer is neutralized with a metal cation salt capable of ionizing or neutralizing the copolymer to the extent desired, generally from about 10% to 100%, preferably from 30% to 100%, and more preferably from 40% to 90%. The amount of metal cation salt needed is that which has enough metal to neutralize up to 100% of the acid groups as desired.

The acid copolymer is preferably made up of from about 10 to about 30% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include, but are not limited to, acrylic acid, methacrylic acid, ethacrylic acid, chloroacrylic acid, crotonic acid, maleic acid, fumaric acid, and itaconic acid, with acrylic acid and methacrylic acid being preferred.

The softening comonomer that can be optionally included in the invention may be selected from the group consisting of vinyl esters of aliphatic carboxylic acids wherein the acids have 2 to 10 carbon atoms and vinyl ethers wherein the alkyl groups contain 1 to 10 carbon atoms.

Consequently, examples of a number of copolymers suitable for use in the invention include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like. The base copolymer broadly contains 1 to about 30% by weight unsaturated carboxylic acid, from about 70 to about 99% by weight ethylene and from 0 to about 40% by weight of a softening comonomer.

Acid copolymers are well known in the golf ball art. Examples of acid copolymers which fulfill the criteria set forth above include, but are not limited, to the Escor™ ethylene-acrylic acid copolymers and Iotek acid terpolymers (ethylene-acrylic acid-acrylate terpolymers) sold by Exxon-Mobile Corporation, such as Escor™ 959, Escor™ 960, AT325 and Iotek™ 7510, and the Primacor™ ethylene-acrylic acid copolymers sold by Dow Chemical Company, Midland, Mich., such as Primacor™ 5980I and Primacor™ 3340I. Other acid copolymers that may be used include ethylene-methacrylic acid copolymers such as Surlyn™ and Nucrel™ available from E. I. DuPont de Nemours & Co. Surlyn™ ionomers are ethylene-methacrylic acid copolymers neutralized with zinc, sodium or lithium ions. Nucrel™ is an ethylene copolymer which is inherently flexible like EVA copolymers, and which offers desirable performance characteristics similar to those of Surlyn™ ionomers. The Nucrel™ acid copolymers are produced by reacting ethylene and methacrylic acid in the presence of free radical initiators. A branched, random ethylene methacrylic acid (EMAA) copolymer is produced thereby. Carboxyl groups are distributed along the chain and interact with carboxyl groups on adjacent molecules to form a weakly cross-linked network through hydrogen bonding. Nucrel™ and Surlyn™ terpolymers are also available.

The acid copolymers used in the invention are neutralized to a desired percentage through the use of metal cation salts. The metal cation salts utilized are those salts that provide the metal cations capable of neutralizing, to various extents, the carboxylic acid groups of the acid copolymer. These include, for example, acetate, oxide or hydroxide salts of lithium, calcium, zinc, sodium, potassium, nickel, magnesium, aluminum, zirconium, and manganese.

Some examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

Additionally a wide variety of pre-neutralized acid copolymers are commercially available. These include both hard and soft pre-neutralized ionomer resins and both low and high acid pre-neutralized ionomer resins.

The hard (high modulus) pre-neutralized ionomers include those ionomers having a hardness greater than 50 on the Shore D scale as measured in accordance with ASTM method D-2240, and a flexural modulus from about 15,000 to about 70,000 psi as measured in accordance with ASTM method D-790.

Pre-neutralized soft ionomer resins can also be used in the present invention. The soft (low modulus) pre-neutralized ionomers are generally acrylic acid or methacrylic acid based soft ionomers. One example of a soft pre-neutralized ionomer is a zinc based ionomer made from an acrylic acid base polymer and an unsaturated monomer of the acrylate ester class. The soft (low modulus) ionomers generally have a hardness from about 20 to about 50 (preferably from about 30 to about 40) as measured on the Shore D scale and a flexural modulus from about 2,000 to about 15,000 psi (preferably from about 3,000 to 10,000 psi) as measured in accordance with ASTM method D-790. Examples of hard and soft ionomers include those Iotek™ ionomers and Surlyn™ ionomers known in the art.

The golf ball 10 has at least one layer composed of the thermoplastic material comprising about 10 to about 95 percent by weight of at least one neutralized acid copolymer, and preferably from about 15 to about 90 percent acid copolymer.

Generally, the ethylene alkyl acrylate copolymers used herein include the copolymers of ethylene and acrylic or methacrylic esters of linear, branched or cyclic alkanols. Preferably, the copolymers contain from about 1 to about 35 weight percent alkyl acrylate and from about 99 to about 65 weight percent ethylene.

Examples of ethylene alkyl acrylate copolymers which may be used include, among others, ethylene-ethyl acrylate (EEA), ethylene-methyl acrylate (EMA), and ethylene-butyl acrylate (EBA) copolymers.

Ethylene-ethyl acrylate (EEA) copolymers are made by the polymerization of ethylene units with randomly distributed ethylene acrylate (EA) comonomer groups. The (EEA) copolymers contain up to about 30% by weight of ethylene acrylate. They are tough, flexible products having a relatively high molecular weight. They have good flexural fatigue and low temperature properties (down to −65° C.). In addition, EEA resists environmental stress cracking as well as ultraviolet radiation.

Examples of ethylene-ethyl acrylates, which may be utilized, include Bakelite™ ethylene-ethyl acrylates available from Union Carbide.

EEA is similar to ethylene vinyl acetate (EVA) in its density-property relationships and high-temperature resistance. In addition, like EVA, EEA is not resistant to aliphatic and aromatic hydrocarbons.

Ethylene-methyl acrylate (EMA) copolymers contain up to about 30% by weight of methyl acrylate and yield blown films having rubberlike limpness and high impact strength. These copolymers may be useful in coating and laminating applications as a result of their good adhesion to commonly used substrates. EMAs have good heat-seal characteristics.

Ethylene-methyl acrylate copolymers are manufactured by reacting, at high temperatures and pressures, methylacrylate monomers with ethylene and free radical initiators. Polymerization occurs such that the methyl acrylate forms random pendant groups on the polyethylene backbone. The acrylic functionality decreases resin crystallinity and increases polarity to enhance resin properties. The properties depend on molecular weight (determined by melt index) and percent crystallinity. Percent crystallinity is determined by comonomer incorporation. As the comonomer content increases, the film become softer; tougher, and easier to heat seal.

EMA films have low modulus (generally less than 10,000 psi), low melting points, and good impact strength. In addition, the EMA resins are highly polar, and as a result are compatible with olefinic and other polymers. They adhere well to many substrates including LDPE, LLDPE, and EVA.

Examples of ethylene-methyl acrylate which may be used in the golf ball components of the present invention include the Optema™ or Escor™ EMA copolymer resins available from ExxonMobil Chemical Company. The Optema™ and Escor™ EMA resins are thermally stable ethylene methyl acrylate resins which will accept up to 65% or more fillers and pigments without losing their properties. They are more thermally stable than EVAs and can be extruded or molded over a range of 275-625° F. (compared to an EVA limit of 450° F.) EMAs are generally not corrosive when compared to EVAs, EAAs and ionomers Ethylene butyl acrylates (EBA) can also be included in the invention. These are generally similar to ethylene methyl acrylate (EMA) with improved low temperature impact strength and high clarity.

Another example is Chevron Chemical Company's ethylene-butyl acrylate copolymer, EBAC™, which is stable at high temperatures, and may be processed as high as 600° F.

Examples of cation salts that may be utilized in the invention for neutralizing the ethylene alkyl copolymers are those salts which provide the metal cations capable of hydrolyzing and neutralizing, to various extents, the carboxylic acid esters groups of the ethylene alkyl copolymers. This converts the alkyl ester into a metal salt of the acid. These metal cation salts include, but are not limited to, oxide, carbonate or hydroxide salts of alkali metals such as lithium, sodium and potassium or mixtures thereof.

Some examples include, but are not limited to, lithium hydroxide monohydrate, lithium hydroxide, lithium carbonate, lithium oxide, sodium hydroxide, sodium oxide, sodium carbonate, potassium hydroxide, potassium oxide and potassium carbonate.

The amount of metal cation salt (preferably an alkali metal cation salt) reacted with the ethylene alkyl acrylate copolymer varies depending upon such factors as the reactivity of the salt and the copolymer used, reaction conditions (such as temperature, pressure, moisture content, and the like) and the desired level of conversion. Preferably, the conversion reaction occurs through saponification wherein the carboxylic acid esters of the ethylene alkyl acrylate copolymer are converted by alkaline hydrolysis to form the salt of the acid and alcohol. Examples of such saponification reactions are set forth in U.S. Pat. Nos. 3,970,626, 4,638,034 and 5,218,057 and are incorporated herein by reference.

The products of the conversion reaction are an alkanol (the alkyl group of which comes from the alkyl acrylate comonomer) and a terpolymer of ethylene, alkyl acrylate, and an alkali metal salt of the (meth)acrylic acid. The degree of conversion or saponification is variable depending on the amount of alkali metal cation salt used and the saponification conditions. Generally from about 10% to about 60% of the ester groups are converted during the saponification reaction. The alkanol and other by products can be removed by normal separation processes leaving the remaining metal cation neutralized (or hydrolyzed) ester-based ionomer resin reaction product.

Alternatively, the ethylene alkyl acrylate copolymer included in the invention can be commercially obtained in a pre-neutralized or saponified condition. For example, a number of metal cation neutralized ester-based ionomer resins produced under the saponification process of U.S. Pat. No. 5,218,057 are available from the Chevron Chemical Company.

Additional examples of the preferred copolymers which fulfill the criteria set forth above, are a series of acrylate copolymers which are commercially available from Exxon-Mobil Corporation, such as Optema™ ethylene methyl acrylates and Enable™ ethylene butyl acrylates; Elvaloy™ ethylene butyl acrylates available from E.I. DuPont de Nemours & Company, and Lotryl™ ethylene butyl acrylic esters available from Atofina Chemical.

The acrylate ester is preferably an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acrylate ester-containing ionic copolymer or copolymers used in the golf ball component can be obtained by neutralizing commercially available acrylate ester-containing acid copolymers such as polyethylene-methyl acrylate-acrylic acid terpolymers, commercially available from ExxonMobil Corporation as Escor™ ATX or poly(ethylene-butyl acrylate-methacrylic acid) terpolymers, commercially available from E.I. DuPont de Nemours & Company as Nucrel™. The acid groups of these materials and blends are neutralized with one or more of various cation salts including zinc, sodium, magnesium, lithium, potassium, calcium, manganese, nickel, and the like. The degree of neutralization ranges from 10 to about 100%, preferably from about 30 to about 100%, and more preferably from about 40 to about 90%. Generally, a higher degree of neutralization results in a harder and tougher cover material.

The fatty acids and salts of fatty acids generally comprise fatty acids neutralized with metal ions. The fatty acids can be saturated or unsaturated fatty acids, and are preferably saturated fatty acids. The fatty acids are generally composed of a chain of alkyl groups containing from about 2 to about 80 carbon atoms, preferably from about 4 to about 30, usually an even number, and having a terminal carboxyl (—COOH) group. The general formula for fatty acids, except for acetic acid, is $CH_3(CH_2)_xCOOH$, wherein the carbon atom count includes the carboxyl group, and x is from about 4 to about 30. Examples of fatty acids suitable for use include, but are not limited to, stearic acid; oleic acid; palmitic acid; pelargonic acid; lauric acid; butryic acid; valeric acid; caproic acid; caprylic acid; capric acid; myristic acid; margaric acid; arachidic acid; behenic acid; lignoceric acid; cerotic acid; carboceric acid; montanic acid; and melissic acid. The fatty acids are preferably neutralized with metal ions such as zinc, calcium, magnesium, barium, sodium, lithium, and aluminum, as well as mixtures of the metal ions, although other metals may also be used. The metal ions are generally metal salts that provide metal ions capable of neutralizing, to various extents, the carboxylic acid groups of the fatty acids. Examples include the sulfate, carbonate, acetate and hydroxylate salts of metals such as zinc, calcium, magnesium and barium. Examples of the fatty acid salts that may be utilized in the invention include, but are not limited to metal stearates, laureates, oleates, palmitates, pelargonates, and the like, such as zinc stearate, calcium stearate, magnesium stearate, barium stearate, and the like. Metal stearates are known in the art and are commercially available from various manufacturers.

The highly neutralized blends of copolymers used to form the golf ball components of the present invention can be produced by reacting the two copolymers with various amounts of the metal cation salts at a temperature above the crystalline melting point of the copolymer, such as a temperature from about 200° F. to about 500° F., preferably from about 250° F. to about 425° F., under high shear conditions at a pressure of from about 100 psi to 10,000 psi. Other well known blending techniques may also be used. The amount of metal cation salt utilized to produce the highly neutralized blend of copolymers is the quantity that provides a sufficient amount of the metal cations to neutralize the desired percentage of the carboxylic acid groups acid copolymer. The copolymers can be blended before or after neutralization, or they can be mixed and neutralized at the same time (that is, the copolymers, metals and fatty acids or salts of fatty acids are mixed together). The fatty acids or salts of fatty acids are added in the desired amounts, generally from about 5 to about 100 parts by weight, preferably from about 10 to about 60 parts by weight, more preferably from about 20 to about 50 parts by weight, and even more preferably from about 30 to about 40 parts by weight.

The various compositions of the present invention may be produced according to conventional melt blending procedures. In a preferred embodiment, the copolymers are blended in a Banbury™ type mixer, two-roll mill, or extruder prior to neutralization. After blending, neutralization then occurs in the melt or molten state in the Banbury™ mixer, mill or extruder. The blended composition is then formed into slabs, pellets, and the like, and maintained in such a state until molding is desired. Alternatively, a simple dry blend of the pelletized or granulated copolymers which have previously been neutralized to a desired extent (and colored masterbatch, if desired) may be prepared and fed directly into the injection molding machine where homogenization occurs in the mixing section of the barrel prior to injection into the mold. If necessary, further additives, such as an inorganic filler, may be added and uniformly mixed before initiation of the molding process.

The compatibility of the alkyl acrylate copolymers with the acid copolymers results in a blend having superior properties over standard ionomer blends, as shown by the improved properties in the Examples detailed below.

Additional materials may also be added to the thermoplastic material when utilized for golf equipment as long as they do not substantially reduce the playability properties of the equipment. Such materials include dyes (for example, Ultramarine Blue™ sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; antioxidants; antistatic agents; and stabilizers. Moreover, the cover compositions utilizing the thermoplastic material may also contain softening agents such as those disclosed in U.S. Pat. Nos. 5,312,857 and 5,306,760, including plasticizers, processing acids, and the like, and reinforcing materials such as glass fibers and inorganic fillers, as long as the desired properties produced are not impaired.

Various fillers may be added to compositions to reduce cost, to increase or decrease weight, to reinforce the material, adjust the density, flex modulus, mold release, and/or melt flow index of a layer, and the like. Examples of heavy weight fillers for use in the invention include titanium, tungsten, aluminum, bismuth, nickel, molybdenum, iron, steel, lead, copper, brass, boron, boron carbide whiskers, bronze, cobalt, beryllium, zinc, tin, metal oxides including zinc oxide, iron oxide, aluminum oxide, titanium oxide, magnesium oxide, zirconium oxide, and metal stearates including zinc stearate, calcium stearate, barium stearate, lithium stearate, magnesium stearate. Other preferred fillers include limestone (ground calcium/magnesium carbonate) and ground flash filler.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The filler preferably is selected from the group consisting of precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. Non-limiting examples of suitable fillers, their densities, and their preferred uses are listed in Table 1:

TABLE 1

FILLERS

| FILLER TYPE | SPEC. GRAV. | COMMENT |
| --- | --- | --- |
| Precipitated hydrated silica | 2.00 | 1, 2 |
| Clay | 2.62 | 1, 2 |
| Talc | 2.85 | 1, 2 |
| Asbestos | 2.50 | 1, 2 |
| Glass fibers | 2.55 | 1, 2 |
| Aramid fibers (KEVLAR) | 1.44 | 1, 2 |
| Mica | 2.80 | 1, 2 |
| Calcium metasilicate | 2.90 | 1, 2 |
| Barium sulfate | 4.60 | 1, 2 |
| Zinc sulfide | 4.10 | 1, 2 |
| Lithopone | 4.2–4.3 | 1, 2 |
| Silicates | 2.10 | 1, 2 |
| Silicon carbide platelets | 3.18 | 1, 2 |
| Silicon carbide whiskers | 3.20 | 1, 2 |
| Tungsten carbide | 15.60 | 1 |
| Diatomaceous earth | 2.30 | 1, 2 |

TABLE 1-continued

FILLERS

| FILLER TYPE | SPEC. GRAV. | COMMENT |
|---|---|---|
| Polyvinyl chloride | 1.41 | 1, 2 |
| CARBONATES | | |
| Calcium carbonate | 2.71 | 1, 2 |
| Magnesium carbonate | 2.20 | 1, 2 |
| METAL AND ALLOYS (POWDERS) | | |
| Titanium | 4.51 | 1 |
| Tungsten | 19.35 | 1 |
| Aluminum | 2.70 | 1 |
| Bismuth | 9.78 | 1 |
| Nickel | 8.90 | 1 |
| Molybdenum | 10.20 | 1 |
| Iron | 7.86 | 1 |
| Steel | 7.8-7.9 | 1 |
| Lead | 11.40 | 1, 2 |
| Copper | 8.94 | 1 |
| Brass | 8.2-8.4 | 1 |
| Boron | 2.34 | 1 |
| Boron carbide whiskers | 2.52 | 1, 2 |
| Bronze | 8.70-8.74 | 1 |
| Cobalt | 8.92 | 1 |
| Beryllium | 1.84 | 1 |
| Zinc | 7.14 | 1 |
| Tin | 7.31 | 1 |
| METAL OXIDES | | |
| Zinc oxide | 5.57 | 1, 2 |
| Iron oxide | 5.10 | 1, 2 |
| Aluminum oxide | 4.00 | 1, 2 |
| Titanium oxide | 3.9-4.1 | 1, 2 |
| Magnesium oxide | 3.3-3.5 | 1, 2 |
| Zirconium oxide | 5.73 | 1, 2 |
| METAL STEARATES | | |
| Zinc stearate | 1.09 | 3, 4 |
| Calcium stearate | 1.03 | 3, 4 |
| Barium stearate | 1.23 | 3, 4 |
| Lithium stearate | 1.01 | 3, 4 |
| Magnesium stearate | 1.03 | 3, 4 |
| PARTICULATE CARBONACEOUS | | |
| Graphite | 1.5-1.8 | 1, 2 |
| Carbon black | 1.80 | 1, 2 |
| Natural bitumen | 1.2-1.4 | 1, 2 |
| Cotton flock | 1.3-1.4 | 1, 2 |
| Cellulose flock | 1.15-1.5 | 1, 2 |
| Leather fiber | 1.2-1.4 | 1, 2 |
| MICRO BALLOONS | | |
| Glass | 0.15-1.1 | 1, 2 |
| Ceramic | 0.2-0.7 | 1, 2 |
| Fly ash | 0.6-0.8 | 1, 2 |
| COUPLING AGENTS | | |
| Titanates | 0.95-1.17 | |
| Zirconates | 0.92-1.11 | |
| Silane | 0.95-1.2 | |

Comments:
1. Particularly useful for adjusting density of the cover layer.
2. Particularly useful for adjusting flex modulus of the cover layer.
3. Particularly useful for adjusting mold release of the cover layer.
4. Particularly useful for increasing melt flow index of the cover layer.

All fillers except for metal stearates would be expected to reduce the melt flow index of an injection molded cover layer.

The amount of filler employed is primarily a function of weight requirements and distribution.

Fillers may be added to any or all layers. The fillers may be used to adjust the properties of the layer, reinforce the layer, or for any other purpose. In the blends of the invention, reinforcing fillers may be used without detracting from or reducing the COR significantly.

Together, the core 12 (and any optional core layers) and the cover layer 16 or layers 14 preferably combine to form a ball having a diameter of 1.680 inches or more, the minimum diameter permitted by the rules of the United States Golf Association and weighing no more than 1.62 ounces for a regulation golf ball. Oversize golf balls may also be produced if desired using the blends of the invention.

In another embodiment, the golf ball may be a one piece or unitary construction golf ball comprising the blend of the invention. The blend of the invention provides a very durable golf ball. The golf ball may be painted or may have a clear coat or other markings if desired.

In a particularly preferred embodiment of the invention, the golf ball has a dimple pattern that provides coverage of 65% or more. The golf ball typically is coated with a durable, abrasion-resistant, relatively non-yellowing finish coat.

The golf balls and golf ball components of the present invention can be produced by molding processes which include but are not limited to those which are currently well known in the golf ball art. For example, the golf ball components can be produced by injection molding, reaction injection, liquid injection and/or compression molding a core, core layer and/or cover layer using the partially to highly neutralized blend of the invention. One or more layers of the golf ball may comprise the partially to highly neutralized blend. Other layers may be the same or different and may comprise any suitable material or blend of materials known in the art.

The thermoplastic material preferably has a Shore D hardness of from about 30 to about 80 Shore D as desired. Additionally, the golf ball core, intermediate ball or finished ball may have a compression of from about 0 to about 160 PGA.

After molding, the golf balls produced may undergo various further processing steps such as buffing, painting and marking as disclosed in U.S. Pat. No. 4,911,451.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Example 1

Three different highly neutralized blends of olefin-acid-acrylate terpolymers and olefin-acrylate copolymers containing metal stearates were produced and formed into neat spheres. The neat spheres were tested for compression and coefficient of restitution. The terpolymer was an ethylene acrylic acid methyl acrylate terpolymer, and the copolymer was an ethylene butyl acrylate copolymer. The terpolymer was used alone and in a blend with the copolymer. A control was the terpolymer with no metal stearate added. Each was neutralized to 100% using magnesium hydroxide ($Mg(OH)_2$). Metal stearate (magnesium stearate) was added to the terpolymer and the terpolymer-copolymer blend. The results are shown on Table 2 below.

Coefficient of restitution (C.O.R.) was measured by firing the resulting golf ball in an air cannon at a velocity of 125 feet per second against a steel plate which was positioned 12 feet from the muzzle of the cannon. The rebound velocity was then measured. The rebound velocity was divided by the forward velocity to give the coefficient of restitution.

The term "compression" utilized in the golf ball trade generally defines the overall deflection that a golf ball undergoes when subjected to a compressive load. For example, compression indicates the amount of change in golf ball's shape upon striking. The development of solid core technology in two-piece or multi-piece solid balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls. In the past, PGA compression related to a scale of from 0 to 200 given to a golf ball. The lower PGA compression value, the softer the feel of the ball upon striking. In practice, tournament quality balls have compression ratings around 40 to 110, and preferably around 50 to 100.

In determining PGA compression using the 0 to 200 scale, a standard force is applied to the external surface of the ball. A ball that exhibits no deflection (0.0 inches in deflection) is rated 200 and a ball which deflects $2/10^{th}$ of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200 to 100) and a ball which deflects 0.110 inches (110×0.001 inches) has a PGA compression of 90 (i.e., 200 to 110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position, the gap between the anvils is 1.780 inches, allowing a clearance of 0.200 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches. When golf ball components (i.e., centers, cores, mantled core, etc.) smaller than 1.680 inches in diameter are utilized, metallic shims are included to produce the combined diameter of the shims and the component to be 1.680 inches.

An example to determine PGA compression can be shown by utilizing a golf ball compression tester produced by OK Automation, Sinking Spring, Pa. (formerly, Atti Engineering Corporation of Newark, N.J.). The compression tester produced by OK Automation is calibrated against a calibration spring provided by the manufacturer. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that is measures the upward movement of the spring-loaded anvil. The golf ball to be tested is placed in the lower platform, which is then raised a fixed distance. The upper portion of the golf ball comes in contact with and exerts a pressure on the spring-loaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Philadelphia, Pa., to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression testers. Using such a device, a Riehle compression of 61 corresponds to a deflection under load of 0.061 inches.

Furthermore, additional compression devices may also be utilized to monitor golf ball compression. These devices have been designed, such as a Whitney Tester, Whitney Systems, Inc., Chelmsford, Mass., or an Instron Device, Instron Corporation, Canton, Mass., to correlate or correspond to PGA or Atti compression through a set relationship or formula.

Compression was measured using an Instron™ Device (model 5544), Instron Corporation, Canton, Mass. Compression of a golf ball, core, or golf ball component is measured to be the deflection (in inches) caused by a 200 lb. load applied in a Load Control Mode at the rate of 15 kips, an approach speed of 20 inches per minute, with a preload of 0.2 lbf plus the system compliance of the device.

TABLE 2

|  | # 1 | # 2 | # 3 |
|---|---|---|---|
| Escor ™ AT325 (EX) | 100 | 100 | 50 |
| Enable ™ 33330 (EY) | 0 | 0 | 50 |
| % Acrylic Acid | 6 | 6 | 3 |
| % Butyl Acrylate | 0 | 0 | 16.25 |
| % Methyl Acrylate | 20 | 20 | 10 |
| % Neutralization | 100 | 100 | 100 |
| % Mg Stearate | 0 | 28.6 | 28.6 |
| Compression (Instron) | 0.141 | 0.105 | 0.118 |
| COR | 0.685 | 0.767 | 0.705 |
| Nes Factor* | 826 | 872 | 823 |

*Nes factor is determined by taking the sum of the Instron compression and resilience (C.O.R.) measurements and multiplying this value by 1000. It represents an optimal combination of softer but more resilient cores.

As can be seen from the results of Example 1, the blend of sample #3 comprising a blend of the acid terpolymer (EX) and the alkyl acrylate copolymer (EY) produced a sphere with a higher COR than the terpolymer alone (sample #1), while the highly neutralized terpolymer with the metal stearate had a much higher COR than the terpolymer without the metal stearate. The addition of the magnesium stearate in both cases increased the COR and the Nes factor of the material, producing an enhanced combination of compression and resilience characteristics as noted by the Nes factor parameter.

Example 2

Additional blends of highly neutralized materials with metal stearates were produced and compared against blends that were not highly neutralized and had no metal stearates added. The blends were made up of an olefin-acid copolymer and an olefin-acrylate copolymer. The blends were further neutralized to about 100% in a Banbury™ mixer using magnesium hydroxide. Zinc stearate was then added to the blend, and the blends were extruded into pellets. The blends were later compression molded into neat spheres and tested as in Example 1. Comparative blends were produced that were not further neutralized and did not have metal stearates added, and these are labeled with the "C". Results are shown in Table 3.

TABLE 3

| | Sample # | | | | | |
|---|---|---|---|---|---|---|
| | # 4C | # 5C | #6C | #4 | #5 | # 6 |
| | | | Blend Type | | | |
| | Control | EX/EY | EX/EY | Control | EX/EY | EX/EY |
| Surlyn™ 6120 (EX) | 100 | 50 | 50 | 100 | 48.2 | 48.2 |
| Lotryl™ 29 MA03 (EY) | 0 | 50 | 50 | 0 | 51.8 | 51.8 |
| Fusabond™ MG423D | 0 | 0 | 5 | 0 | 0 | 0 |
| % Zn Stearate (approx.) | 0 | 0 | 0 | 33.3 | 19 | 29.5 |
| % Neutralization* | 40 | 40 | 40 | 100 | 100 | 100 |
| % Methacrylic Acid | 19 | 9.5 | 9 | 19 | 9.2 | 9.2 |
| % Acrylate | 0 | 15 | 14.5 | 0 | 15 | 15 |
| Compression | 0.049 | 0.078 | 0.098 | 0.065 | 0.089 | 0.090 |
| (Instron) COR | 0.742 | 0.645 | 0.643 | 0.753 | 0.697 | 0.731 |
| Nes Factor | 791 | 723 | 741 | 818 | 786 | 821 |

*The percent neutralization was estimated based on the metals analysis of the material.

The results in Table 3 show that the COR increases with the metal stearate or fatty acid salt level. Additionally, highly neutralized blends of EX/EY copolymers also containing metal stearates have a much higher COR and are considerably softer than the comparative blends without the metal stearates and those that are not as highly neutralized. Sample 6C shows that the addition of a small amount of Fusabond™ produces a much softer material at the same resilience or COR level.

Example 3

Further examples were produced using different starting materials to compare an acid terpolymer and alkyl acrylate copolymer blend against an acid copolymer and alkyl acrylate copolymer (EX/EY) blend. Three different starting blends were produced as follows:

| Blend 1 (EX) | | Blend 2 (EY) | | Blend 3 (EXY) | |
|---|---|---|---|---|---|
| Primacor™ 5980 | 100 pbw | Lotryl™ 29 MA03 | 100 pbw | Escor™ AT325 | 100 pbw |
| Mg Stearate | 66.7 pbw | Mg Stearate | 67 pbw | Mg Stearate | 66.7 pbw |
| Mg Hydroxide | 8.28 pbw | | | Mg Hydroxide | 2.43 pbw |

Note:
Primacor™ 5980 is an ethylene acrylic acid copolymer with approximately 20% acid;
Lotryl™ 29 MA03 is an ethylene methyl acrylate copolymer with about 29% methyl acrylate; and
Escor AT325 is an ethylene acrylic acid methyl acrylate terpolymer with about 6% acid and about 20% methyl acrylate ("EXY", which is a blend of ethylene/acrylic acid/alkyl acrylate).

The blends were then mixed together in various combinations and extruded. Neat spheres were produced in the same manner as previously discussed. Results are shown in Table 4 below.

TABLE 4

| | Sample # | | | | | |
|---|---|---|---|---|---|---|
| | # 7 | # 8 | #9 | #10 | #11 | # 12 |
| | | | Blend Type | | | |
| | EX/EXY | EX/EY | EX/EY | EX/EY | EX/EY | EX/EY |
| Blend 1% (EX) | 25 | 46.3 | 46.3 | 46.3 | 37.04 | 37.04 |
| Blend 2% (EY) | 0 | 53.7 | 45.3 | 37 | 53.7 | 37 |
| Blend 3% (EXY) | 75 | 0 | 0 | 0 | 0 | 0 |
| Primacor™ 5980% | 0 | 0 | 0 | 0 | 5.6 | 5.6 |

TABLE 4-continued

|  | Sample # | | | | | |
|---|---|---|---|---|---|---|
|  | # 7 | # 8 | #9 | #10 | #11 | # 12 |
|  | | | Blend Type | | | |
|  | EX/EXY | EX/EY | EX/EY | EX/EY | EX/EY | EX/EY |
| Fusabond ™ MG-423D % | 0 | 0 | 5 | 10 | 0 | 10 |
| % Acrylic Acid | 9.5 | 9.5 | 9.5 | 9.5 | 9.5 | 9.5 |
| % Methyl Acrylate | 15 | 15.6 | 13.1 | 10.73 | 15.6 | 10.73 |
| % Neutralization | 100 | 100 | 100 | 100 | 80 | 80 |
| % Mg Stearate | 40 | 40 | 36.6 | 40 | 40 | 40 |
| Compression (Instron) | 0.091 | 0.081 | 0.083 | 0.082 | 0.082 | 0.082 |
| COR | 0.782 | 0.809 | 0.797 | 0.804 | 0.805 | 0.805 |
| Nes Factor | 873 | 890 | 880 | 886 | 887 | 887 |
| Shore C/D | 82/59 | 81/59 | 81/59 | 81/59 | 81/59 | 82/60 |
| Breaks/Cracks | None | 2 of 3 | 2 of 3 | 1 small crack | 1 of 3 | 2 of 3 |

The results in Table 4 show that the EX/EY blends have superior COR and Nes Factor as compared to the control sample, which is a commercially available EXY material. The breaks in samples 8 to 12 were the result of molding the spheres at too low of a temperature, thereby forming knit lines that easily broke.

Example 4

Further examples were produced using different starting materials to compare an acid copolymer and acid terpolymer blend (EX/EXY) against an acid copolymer and alkyl acrylate copolymer blend (EX/EY). The blends were mixed (dry blending) together in various combinations and extruded in a Prism twin screw. Neat spheres were produced in the same manner as previously discussed. Results are shown in Table 5 below.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Sample 13 was a control blend of ionomers (E/MAA and E/MAA with a softening co-monomer added) (EX/EXY). Samples 14 and 15 were the control blend of #13 with magnesium stearate added at 40% level. Sample 15 was additionally neutralized to about 90%. Sample 16 was an unneutralized blend of acid copolymers (E/MAA) and an alkyl acrylate copolymer (EX/EY) without additional neutralization or fatty acid/fatty acid salt. Samples 17 and 18 were the EX/EY blend of sample 16 with magnesium stearate added at 40% level. Sample #18 was additionally neutralized to about 90% neutralization respectively. Samples 19 to 21 were single materials extruded and molded into neat spheres to show the properties of commercially available EXY material and an EY material.

TABLE 5

|  | Sample # | | | | | | | | |
|---|---|---|---|---|---|---|---|---|---|
|  | # 13 | #14 | # 15 | # 16 | #17 | #18 | #19 | #20 | #21 |
|  | | | | Blend Type | | | | | |
|  | EX/EXY | EX/EXY | EX/EXY | EX/EY | EX/EY | EX/EY | EXY | EXY | EY |
| Surlyn ™ 9910 (EX) | 45 | 45 | 45 | 46 | 46 | 46 | 0 | 0 | 0 |
| Surlyn ™ 8920 (EX) | 30 | 30 | 30 | 39 | 39 | 39 | 0 | 0 | 0 |
| Surlyn ™ 8320 (EXY) | 25 | 25 | 25 | 0 | 0 | 0 | 0 | 0 | 0 |
| Lotryl ™ 29MA03 (EY) | 0 | 0 | 0 | 15 | 15 | 15 | 0 | 0 | 100 |
| HPF 1000 | 0 | 0 | 0 | 0 | 0 | 0 | 100 | 0 | 0 |
| HPF 2000 | 0 | 0 | 0 | 0 | 0 | 0 | 0 | 100 | 0 |
| % Mg Stearate | 0 | 40 | 40 | 0 | 40 | 40 | * | * | 0 |
| % Neutralization | NA | NA | ~90 | NA | NA | ~90 | 100 | 100 | 0 |
| Comp. (Instron) | 0.058 | 0.074 | 0.078 | 0.059 | 0.077 | 0.080 | 0.087 | 0.095 | 0.257 |
| COR | .702 | 0.783 | 0.803 | 0.726 | 0.787 | 0.797 | 0.819 | 0.841 | 0.528 |
| Nes Factor | 760 | 857 | 881 | 785 | 864 | 877 | 906 | 936 | 785 |
| Shore D | 64 | 60 | 59 | 65 | 59 | 59 | 54 | 51 | 27 |

*HPF 1000 and HPF 2000 are commercially available EXY materials presumably produced using a fatty acid, such as magnesium stearate or magnesium oleate. The HPF materials were used as purchased.

The results clearly show that the addition of the fatty acid salts increase the compression, COR and Nes Factor of both the control EX/EXY blends as well as the EX/EY blends of the invention. The neutralization of the blends with the fatty acid salts provides additional improvement in the properties. The EX/EY blends are softer and faster than the EX/EXY blends of the prior art.

Example 5

Further examples were produced using different starting materials to compare an acid copolymer and acid terpolymer blend (EX/EXY) against an acid copolymer and alkyl acrylate copolymer blend (EX/EY) when used as a cover material on a two piece golf ball. The blends were mixed (dry blending) together in various combinations and extruded in a Prism twin screw extruder. Covers were molded over cores to produce a finished two piece golf ball. The cores used were standard cores (1.557 inches diameter, 37.8 grams, Instron Compression of 0.107, COR of 0.784, and a Nes Factor of 891). Results are shown in Table 6 below. Amounts are in parts by weight unless otherwise stated.

TABLE 6

| | Sample # | | | | | | | |
|---|---|---|---|---|---|---|---|---|
| | # 22 | # 23 | # 24 | #25 | #26 | #27 | #28 | #29 |
| | | | | Blend Type | | | | |
| | EX/EXY | EX/EXY | EX/EXY | EX/EY | EX/EY | EX/EY | EXY | EXY |
| Surlyn ™ 9910 (EX) | 35.5 | 35.5 | 35.5 | 36.5 | 36.5 | 36.5 | 0 | 0 |
| Surlyn ™ 8920 (EX) | 30 | 30 | 30 | 39 | 39 | 39 | 0 | 0 |
| Surlyn ™ 8320 (EXY) | 25 | 25 | 25 | 0 | 0 | 0 | 0 | 0 |
| Lotryl ™ 29MA03 (EY) | 0 | 0 | 0 | 15 | 15 | 15 | 0 | 0 |
| HPF 1000 (EXY) | 0 | 0 | 0 | 0 | 0 | 0 | 97.5 | 0 |
| HPF 2000 (EXY) | 0 | 0 | 0 | 0 | 0 | 0 | 0 | 97.5 |
| Mg Stearate | 0 | 0 | 66.7 | 0 | 66.7 | 0 | * | * |
| Ca Stearate | 0 | 66.7 | 0 | 0 | 0 | 66.7 | 0 | 0 |
| Masterbatch | 9.5 | 9.5 | 9.5 | 9.5 | 9.5 | 9.5 | 0 | 0 |
| TiO$_2$ | 0 | 1.6 | 1.6 | 0 | 1.6 | 1.6 | 2.5 | 2.5 |
| Comp. (Instron) | 0.100 | 0.099 | 0.102 | 0.100 | 0.100 | 0.099 | 0.105 | 0.105 |
| COR | 0.793 | 0.804 | 0.796 | 0.793 | 0.796 | Broke | 0.796 | 0.790 |
| Nes Factor | 893.6 | 902.7 | 897.2 | 893.6 | 895.7 | NA | 901.2 | 894.6 |
| Shore D | 65 | 67 | 63–64 | 65 | 62–63 | 66–67 | 60 | 54–55 |

*HPF 1000 and HPF 2000 are commercially available EXY materials presumably produced using a fatty acid, such as magnesium stearate or magnesium oleate. The HPF materials were used as purchased.

Sample 22 was a control sample of a prior art EX/EXY blend. Sample 25 was a control sample of EX/EY with no fatty acid salt added to the blend. As shown in the above results, samples of both EX/EXY and EX/EY modified with both magnesium stearate and calcium stearate have increased COR and Nes Factor over comparable samples that are not modified with a fatty acid. The magnesium stearate lowers the Shore D hardness, while the calcium stearate increases the Shore D hardness. Therefore, depending on the desired final properties of the cover material (or mantle material), different fatty acids may be used.

In one embodiment, the golf ball 10 is constructed with a cover 16 composed of a polyurethane material as set forth in U.S. Pat. No. 6,117,024, for a Golf Ball With A Polyurethane Cover, which pertinent parts are hereby incorporated by reference. The golf ball 10 has a core 12, a boundary layer 14 or both composed of the thermoplastic material of the present invention. The golf ball 10 preferably has a coefficient of restitution at 143 feet per second greater than 0.7964, and an USGA initial velocity less than 255.0 feet per second. The golf ball 10 more preferably has a COR of approximately 0.8152 at 143 feet per second, and an initial velocity between 250 feet per second to 255 feet per second under USGA initial velocity conditions. A more thorough description of a high COR golf ball is disclosed in U.S. Pat. No. 6,443,858, which pertinent parts are hereby incorporated by reference.

Additionally, the core of the golf ball 10 may be solid, hollow, or filled with a fluid, such as a gas or liquid, or have a metal mantle. The cover 16 of the golf ball 10 may be any suitable material. A preferred cover for a three-piece golf ball is composed of a thermoset polyurethane material. Alternatively, the cover 16 is composed of a thermoplastic polyurethane, ionomer blend, ionomer rubber blend, ionomer and thermoplastic polyurethane blend, or like materials. Alternatively, the golf ball 10 may have a thread layer. Those skilled in the pertinent art will recognize that other cover materials may be utilized without departing from the scope and spirit of the present invention. The golf ball 10 may have a finish of one or two basecoats and/or one or two top coats.

In an alternative embodiment of a golf ball 10, the boundary layer 14 or cover layer 16 is comprised of a high acid (i.e. greater than 16 weight percent acid) ionomer resin or high acid ionomer blend, and the core 12 is composed of the thermoplastic material of the present invention, or if the cover layer 16 is composed of an high acid ionomer or a high acid ionomer blend, then the boundary layer 14 and or core 12 is composed of the thermoplastic material of the present invention. More preferably, the boundary layer 14 is comprised of a blend of two or more high acid (i.e. greater than 16 weight percent acid) ionomer resins neutralized to various extents by different metal cations.

In an alternative embodiment of a golf ball 10, the boundary layer 14 or cover layer 16 is comprised of a low acid (i.e. 16 weight percent acid or less) ionomer resin or low acid ionomer blend. Preferably, the boundary layer 14 is comprised of a blend of two or more low acid (i.e. 16 weight percent acid or less) ionomer resins neutralized to various extents by different metal cations. The boundary layer 14 compositions of the embodiments described herein may include the high acid ionomers such as those developed by E. I. DuPont de Nemours & Company under the SURLYN brand, and by Exxon Corporation under the ESCOR or IOTEK brands, or blends thereof. Examples of compositions which may be used as the boundary layer 16 herein are set forth in detail in U.S. Pat. No. 5,688,869, which is incorporated herein by reference. Of course, the boundary layer 14 high acid ionomer compositions are not limited in any way to those compositions set forth in said patent. Those compositions are incorporated herein by way of examples only.

The high acid ionomers which may be suitable for use in formulating the boundary layer 14 compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10-100%, preferably 30-70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce boundary layer 16 compositions exhibiting enhanced hardness and resilience due to synergies which occur during processing. Consequently, these metal cation neutralized high acid ionomer resins can be blended to produce substantially higher C.O.R.'s than those produced by the low acid ionomer boundary layer 16 compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the boundary layer 14 of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The boundary layer 14 compositions may include the low acid ionomers such as those developed and sold by E. I. DuPont de Nemours & Company under the SURLYN and by Exxon Corporation under the brands ESCOR and IOTEK, ionomers made in-situ, or blends thereof.

Another embodiment of the boundary layer 14 comprises a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which preferably have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the brand HYTREL, or thermoplastic block polyamides, for example, a polyether amide such as that marketed by Elf Atochem S. A. under the brand PEBEX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

Additional materials suitable for use in the boundary layer 14 or cover layer 16 of the present invention include polyurethanes. These are described in more detail below.

In one embodiment, the cover layer 16 is comprised of a relatively soft, low flex modulus (about 500 psi to about 50,000 psi, preferably about 1,000 psi to about 25,000 psi, and more preferably about 5,000 psi to about 20,000 psi) material or blend of materials. Preferably, the cover layer 16 comprises a polyurethane, a polyurea, a blend of two or more polyurethanes/polyureas, or a blend of one or more ionomers or one or more non-ionomeric thermoplastic materials with a polyurethane/polyurea, preferably a thermoplastic polyurethane or reaction injection molded polyurethane/polyurea (described in more detail below).

The cover layer 16 preferably has a thickness in the range of 0.005 inch to about 0.15 inch, more preferably about 0.010 inch to about 0.050 inch, and most preferably 0.015 inch to 0.025 inch. In one embodiment, the cover layer 14 has a Shore D hardness of 60 or less (or less than 90 Shore C), and more preferably 55 or less (or about 80 Shore C or less). In another preferred embodiment, the cover layer 16 is comparatively harder than the boundary layer 14.

In one preferred embodiment, the cover layer 16 comprises a polyurethane, a polyurea or a blend of polyurethanes/polyureas. Polyurethanes are polymers which are used to form a broad range of products. They are generally formed by mixing two primary ingredients during processing. For the most commonly used polyurethanes, the two primary ingredients are a polyisocyanate (for example, 4,4'-diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, such as whether the material is thermoset (cross linked molecular structure not flowable with heat) or thermoplastic (linear molecular structure flowable with heat).

Cross linking occurs between the isocyanate groups (—NCO) and the polyol's hydroxyl end-groups (—OH). Cross linking will also occur between the $NH_2$ group of the amines and the NCO groups of the isocyanates, forming a polyurea. Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM")) or may be on the order of several hours or longer (as in several coating systems such as a cast system). Consequently, a great variety of polyurethanes are suitable for different end-uses.

Polyurethanes are typically classified as thermosetting or thermoplastic. A polyurethane becomes irreversibly "set" when a polyurethane prepolymer is cross linked with a polyfunctional curing agent, such as a polyamine or a polyol. The prepolymer typically is made from polyether or polyester. A prepolymer is typically an isocyanate terminated polymer that is produced by reacting an isocyanate with a moiety that has active hydrogen groups, such as a polyester and/or polyether polyol. The reactive moiety is a hydroxyl group. Diisocyanate polyethers are preferred because of their water resistance.

The physical properties of thermoset polyurethanes are controlled substantially by the degree of cross linking and by the hard and soft segment content. Tightly cross linked polyurethanes are fairly rigid and strong. A lower amount of cross linking results in materials that are flexible and resilient. Thermoplastic polyurethanes have some cross linking, but primarily by physical means, such as hydrogen bonding. The crosslinking bonds can be reversibly broken by increasing temperature, such as during molding or extrusion. In this regard, thermoplastic polyurethanes can be injection molded, and extruded as sheet and blow film. They can be used up to about 400 degrees Fahrenheit, and are available in a wide range of hardnesses.

Polyurethane materials suitable for the present invention may be formed by the reaction of a polyisocyanate, a polyol, and optionally one or more chain extenders. The polyol component includes any suitable polyether- or polyester polyol. Additionally, in an alternative embodiment, the polyol component is polybutadiene diol. The chain extenders include, but are not limited to, diols, triols and amine extenders. Any suitable polyisocyanate may be used to form a polyurethane according to the present invention. The polyisocyanate is preferably selected from the group of diisocyanates including, but not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis(isocyanato methyl)cyclohexane; and polymethylene polyphenyl isocyanate ("PMDI").

One additional polyurethane component which can be used in the present invention incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

The cover layer 16 preferably comprises a polyurethane with a Shore D hardness (plaque) of from about 10 to about 55 (Shore C of about 15 to about 75), more preferably from about 25 to about 55 (Shore C of about 40 to about 75), and most preferably from about 30 to about 55 (Shore C of about 45 to about 75) for a soft cover layer 16 and from about 20 to about 90, preferably about 30 to about 80, and more preferably about 40 to about 70 for a hard cover layer 14.

The polyurethane preferably has a flex modulus from about 1 to about 310 Kpsi, more preferably from about 3 to about 100 Kpsi, and most preferably from about 3 to about 40 Kpsi for a soft cover layer 14 and 40 to 90 Kpsi for a hard cover layer 14.

Non-limiting examples of a polyurethane suitable for use in the cover layer 16 (or boundary layer 14) include a thermoplastic polyester polyurethane such as Bayer Corporation's TEXIN polyester polyurethane (such as TEXIN DP7-1097 and TEXIN 285 grades) and a polyester polyurethane such as B. F. Goodrich Company's ESTANE polyester polyurethane (such as ESTANE X-4517 grade). The thermoplastic polyurethane material may be blended with a soft ionomer or other non-ionomer. For example, polyamides blend well with soft ionomer.

Other soft, relatively low modulus non-ionomeric thermoplastic or thermoset polyurethanes may also be utilized, as long as the non-ionomeric materials produce the playability and durability characteristics desired without adversely affecting the enhanced travel distance characteristic produced by the high acid ionomer resin composition. These include, but are not limited to thermoplastic polyurethanes such as the PELLETHANE thermoplastic polyurethanes from Dow Chemical Co.; and non-ionomeric thermoset polyurethanes including but not limited to those disclosed in U.S. Pat. No. 5,334,673 incorporated herein by reference.

Typically, there are two classes of thermoplastic polyurethane materials: aliphatic polyurethanes and aromatic polyurethanes. The aliphatic materials are produced from a polyol or polyols and aliphatic isocyanates, such as $H_{12}MDI$ or HDI, and the aromatic materials are produced from a polyol or polyols and aromatic isocyanates, such as MDI or TDI. The thermoplastic polyurethanes may also be produced from a blend of both aliphatic and aromatic materials, such as a blend of HDI and TDI with a polyol or polyols.

Generally, the aliphatic thermoplastic polyurethanes are lightfast, meaning that they do not yellow appreciably upon exposure to ultraviolet light. Conversely, aromatic thermoplastic polyurethanes tend to yellow upon exposure to ultraviolet light. One method of stopping the yellowing of the aromatic materials is to paint the outer surface of the finished ball with a coating containing a pigment, such as titanium dioxide, so that the ultraviolet light is prevented from reaching the surface of the ball. Another method is to add UV absorbers, optical brighteners and stabilizers to the clear coating(s) on the outer cover, as well as to the thermoplastic polyurethane material itself. By adding UV absorbers and stabilizers to the thermoplastic polyurethane and the coating(s), aromatic polyurethanes can be effectively used in the outer cover layer of golf balls. This is advantageous because aromatic polyurethanes typically have better scuff resistance characteristics than aliphatic polyurethanes, and the aromatic polyurethanes typically cost less than the aliphatic polyurethanes.

Other suitable polyurethane materials for use in the present invention golf balls include reaction injection molded ("RIM") polyurethanes. RIM is a process by which highly reactive liquids are injected into a mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as a polyether polyol or polyester polyol, polyamine, or other material with an active hydrogen, and one or more isocyanate-containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM. Further descriptions of suitable RIM systems is disclosed in U.S. Pat. No. 6,663,508, which pertinent parts are hereby incorporated by reference.

Non-limiting examples of suitable RIM systems for use in the present invention are BAYFLEX elastomeric polyurethane RIM systems, BAYDUR GS solid polyurethane RIM systems, PRISM solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and ELASTOLIT SR systems from BASF (Parsippany, N.J.). Preferred RIM systems include BAYFLEX MP-10000, BAYFLEX MP-7500 and BAYFLEX 110-50, filled and unfilled. Further preferred examples are polyols, polyamines and isocyanates formed by processes for recycling polyurethanes and polyureas. Additionally, these various systems may be modified by incorporating a butadiene component in the diol agent.

Another preferred embodiment is a golf ball in which at least one of the boundary layer 14 and/or the cover layer 16 comprises a fast-chemical-reaction-produced component. This component comprises at least one material selected from the group consisting of polyurethane, polyurea, polyurethane ionomer, epoxy, and unsaturated polyesters, and preferably comprises polyurethane, polyurea or a blend comprising polyurethanes and/or polymers. A particularly preferred form of the invention is a golf ball with a cover comprising polyurethane or a polyurethane blend.

The polyol component typically contains additives, such as stabilizers, flow modifiers, catalysts, combustion modifiers, blowing agents, fillers, pigments, optical brighteners, and release agents to modify physical characteristics of the cover. Polyurethane/polyurea constituent molecules that were derived from recycled polyurethane can be added in the polyol component.

The surface geometry of the golf ball 10 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of the golf ball 10 may have a non-dimple pattern such as disclosed in U.S. Pat. No. 6,290,615 filed on Nov. 18, 1999 for A Golf Ball Having Tubular lattice Pattern, which pertinent parts are hereby incorporated by reference.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball comprising:
   a core comprising a polybutadiene mixture, the core having a diameter ranging from 1.35 inches to 1.64 inches;
   a boundary layer formed over the core, the boundary layer composed of a thermoplastic material comprising
   a copolymer of an alpha-olefin and an alpha, beta-unsaturated carboxylic acid,
   an alpha-olefin and an alkyl acrylate,
   magnesium stearate,
   wherein the thermoplastic material is neutralized from 50% to 100%; and
   a cover injection molded over the boundary layer, the cover material composed of a blend of ionomers with at least one high acid ionomer having an acid content ranging from 17% to 25%, the cover material having a Shore D hardness greater than 60 as measured according to ASTM-D2240, and a thickness ranging from 0.010 inch to 0.050 inch, and wherein the cover layer has a Shore D hardness greater than the Shore D hardness of the boundary layer.

2. The golf ball according to claim 1 wherein the alpha-olefin is ethylene.

3. The golf ball according to claim 1 wherein the thermoplastic material of the boundary layer comprises from about 10 to about 60 parts by weight fatty acid or fatty acid salt.

4. A golf ball comprising:
   a core comprising a polybutadiene mixture, the core having a diameter ranging from 1.35 inches to 1.64 inches and having a PGA compression ranging from 50 to 90;
   a boundary layer formed over the core, the boundary layer composed of a thermoplastic material, the boundary layer having a thickness ranging from 0.020 inch to 0.075 inch, the thermoplastic material having a Shore D hardness ranging from 50 to 70 as measured according to ASTM-D2240, wherein the thermoplastic material comprises
   a copolymer of an alpha-olefin and an alpha, beta-unsaturated carboxylic acid,
   an alpha-olefin and an alkyl acrylate, and
   calcium stearate,
   wherein the thermoplastic material is neutralized from 50% to 100%, and wherein the thermoplastic material of the boundary layer comprises about 67 parts by weight calcium stearate, and the boundary layer has a Shore D hardness of approximately 67; and
   a cover formed over the boundary layer, the cover composed of a fast chemical reaction aliphatic polyurethane material formed from reactants comprising and a polyurethane prepolymer and a polyol, wherein the polyurethane material has a Shore D hardness ranging from 30 to 60 as measured according to ASTM-D2240, a thickness ranging from 0.015 inch to 0.044 inch, and an aerodynamic surface geometry thereon, and wherein the boundary layer has a Shore D hardness greater than the Shore D hardness of the cover.

5. The golf ball according to claim 4 wherein the polyurethane prepolymer is a polytetramethylene ether glycol terminated 4,4'-diphenylmethane diisocyanate polyurethane prepolymer.

6. The golf ball according to claim 4 wherein the alpha-olefin and alkyl acrylate is an ethylene butyl acrylate copolymer and the copolymer of an alpha-olefin and an alpha, beta-unsaturated carboxylic acid is an ethylene acrylic acid methyl acrylate terpolymer.

\* \* \* \* \*